United States Patent Office 3,721,600
Patented Mar. 20, 1973

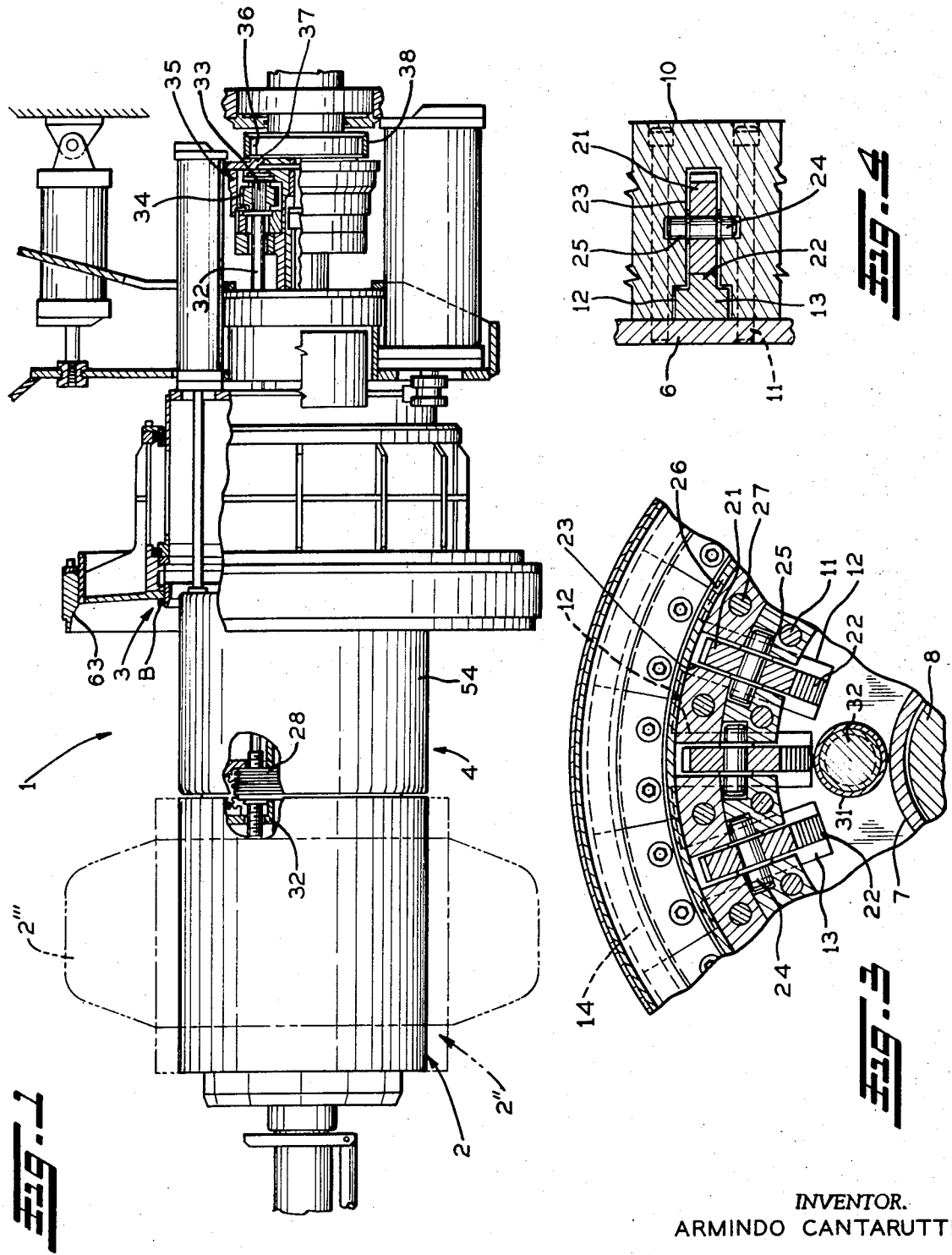

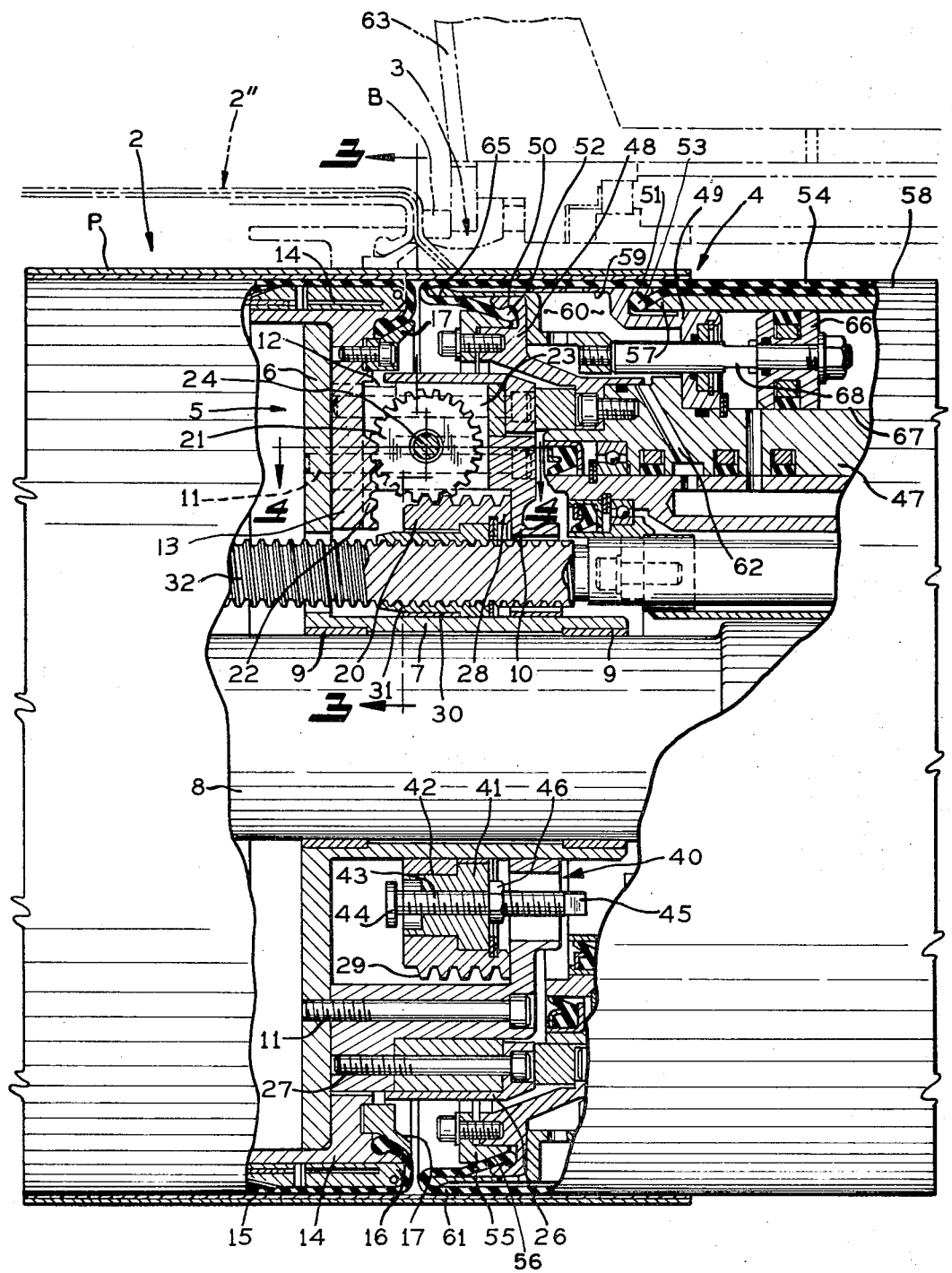

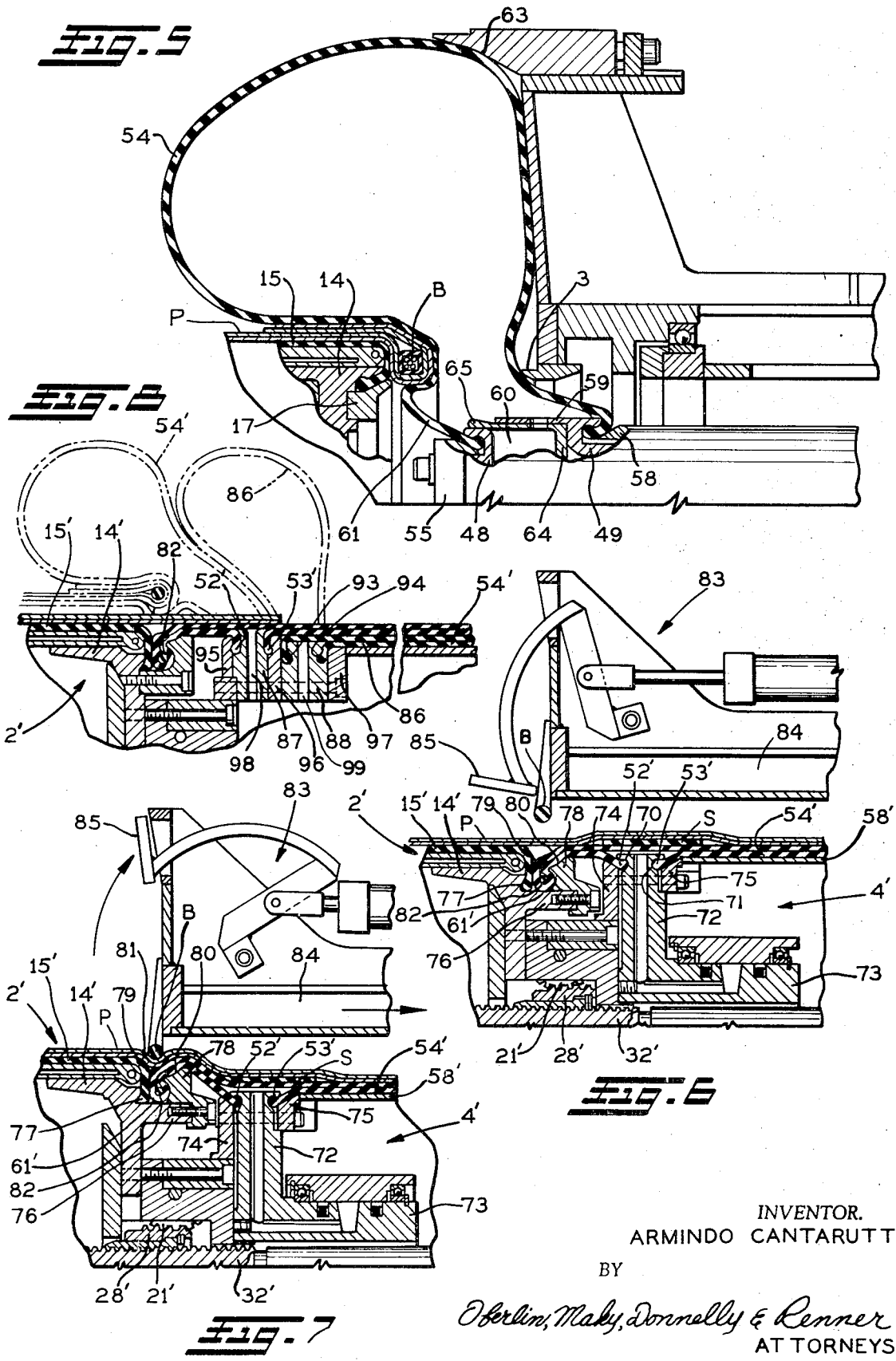

3,721,600
TIRE BUILDING MACHINE
Armindo Cantarutti, Akron, Ohio, assignor to
NRM Corporation, Akron, Ohio
Filed Aug. 19, 1970, Ser. No. 65,139
Int. Cl. B29h 17/12, 17/16
U.S. Cl. 156—401    18 Claims

ABSTRACT OF THE DISCLOSURE

A tire building machine including an expandable drum having a plurality of radially movable drum segments which are simultaneously moved a predetermined amount by controlled axial movement of an annular rack having external teeth in meshing engagement with a plurality of pinions for driving radial racks associated with each of the drum segments. An adjustable stop means may also be provided on the annular rack for limiting axial movement of the rack in the direction of expansion of the radially movable segments, and the ply turn-up and side wall applying mechanism may comprise an inflatable bladder having an axial inner marginal portion clamped to the radially movable drum segments for radial movement therewith into engagement with the tire bead disposed thereabout for uniform and concentric clamping of the tire bead while the remaining portion of the bladder is supported by a rigid support adjacent the end of the drum.

BACKGROUND OF THE INVENTION

This invention relates generally as indicated to a tire building machine, and more particularly, to certain improvements in tire building machines for obtaining uniform and concentric placement of the tire beads with respect to the ends of an expandable drum and subsequent effective ply turn-up of the tire plies around the bead and proper placement of the side wall material against the tire carcass.

An expandable tire building drum may consist of a plurality of radially movable segments or sectors extending the full length of the drum, or such segments may be located at the ends of the drum only for contracting and expanding only the shoulders of the drum. Accurate control over the amount of expansion of the drum segments is important in obtaining uniform and concentric placement of the tire beads with respect to the ends of the drum, and accurate positioning of the ply turn-up mechanism with respect to the tire beads is also important to obtaining proper ply turn-up and side wall placement.

Previous known mechanisms for expanding and contracting such drum segments were usually only capable of moving the drum segments between the full expanded and full contracted positions and did not provide for any variation or control over such movements. Accurate positioning of the ply turn-up bladders with respect to the tire beads was sometimes obtained by mounting the bladders on the ends of the drum for expansion with the drum into engagement with the tire beads, but this subjected the bladder beads to undesirable stresses and also required a longer drum than usual to accommodate the bladders.

SUMMARY OF THE INVENTION

It is accordingly a principal object of this invention to provide a tire building machine in which the movements of the radially movable drum segments may be accurately controlled for obtaining uniform and concentric clamping of the tire beads against the ends of the drum.

Another object is to provide such a tire building machine with a novel ply turn-up and side wall applying mechanism including an inflatable bladder which may be accurately located with respect to the ends of the drum for obtaining effective ply turn-up and accurate side wall placement without subjecting the bladder to undue stresses.

Still another object is to provide such a tire building machine which does not require either a ply turn-down device or a pusher ring.

Controlled expansion and contraction of the drum segments is achieved by providing radial racks for each of the radially movable drum segments engaged by a plurality of pinions all of which are rotatable together by an axially movable annular rack. Axial movement of the annular rack is obtained by rotation of one or more rods having threaded engagement with nuts carried by the annular rack. By controlling the number of revolutions of the rods, the extent of radial movement of the drum segments may be controlled for accurate positioning of the drum segments with respect to tire beads to be placed thereagainst. An adjustable stop may also be mounted on the annular rack for limiting axial movement of the annular rack in the direction of expansion of the radially movable drum segments. The drum segments may be expanded after the tire plies have been applied to the drum and ply turn-up mechanism to eliminate the need for a ply turn-down device, and after the tire beads have been properly set, the previously applied tire plies underlying the beads are turned up over the beads by inflation of a ply turn-up bladder. Accurate postioning of the ply turn-up bladder with respect to the beads prior to inflation is important in obtaining effective ply turn-up. In one form of the invention, this is accomplished by providing a stop on the ply turn-up mechanism for accurately locating the folded inner marginal portion of the bladder with respect to the end of the drum, whereas in another form of the invention, the folded inner marginal portion of the bladder is clamped to the expandable drum segments for radial movement therewith. The clamping segments which clamp the inner marginal portion of the bladder to the drum segments form a circumferential groove to accommodate the tire bead when the drum is expanded radially outwardly into engagement therewith, which not only provides an excellent bead seat but also accurately locates the folded inner marginal portion of the bladder with respect to the tire bead. The remainder of the bladder is supported by a rigid support adjacent the end of the drum, whereby only the inner marginal portion of the bladder expands with the drum. A pusher ring may be used to press the bladder axially toward the end of the drum when inflated or a second inflatable bladder may be used for that purpose.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a fragmentary side elevation view, partly in section, of a preferred form of tire building machine constructed in accordance with this invention;

FIG. 2 is an enlarged fragmentary longitudinal section through one end of the expandable drum and associated ply turn-up and side wall applying mechanism for the tire building machine of FIG. 1;

FIG. 3 is a fragmentary transverse section through the right end of the drum, taken on the plane of the line 3—3 of FIG. 2;

FIG. 4 is a horizontal section through one of the radially movable drum segments and associated mechanism for expanding and contracting such drum segments, taken on the plane of the line 4—4 of FIG. 2;

FIG. 5 is an enlarged fragmentary longitudinal section through the right end of the drum and associated ply turn-up and side wall applying mechanism of FIG. 1, but showing the drum expanded and ply turn-up bladder inflated for obtaining proper ply turn-up;

FIG. 6 is an enlarged fragmentary longitudinal section through a modified form of tire building drum and ply turn-up and side wall applying mechanism in accordance with this invention showing the drum segments contracted and the ply turn-up bladder deflated;

FIG. 7 is an enlarged fragmentary longitudinal section similar to FIG. 6 but showing the drum segments expanded into engagement with a tire bead; and FIG. 8 is an enlarged fragmentary longitudinal section through still another form of tire building drum and ply turn-up and side wall applying mechanism in accordance with this invention.

DESCRIPTION OF THE PREFERRED EMBODIMENTS

In FIG. 1 there is schematically shown a portion of a preferred form of tire building machine 1 in accordance with this invention which may be used to make conventional truck or passenger tires or radial or belted tires, and includes an expandable drum 2 with bead setting ring 3 and ply turn-up and side wall applying mechanism 4 associated with each end of the drum. Since the bead setting ring 3 and ply turn-up and side wall applying mechanism 4 at both ends of the drum may be of identical construction, only those parts associated with the right end of the drum are shown for ease of illustration.

For a more clear understanding of the details of construction and operation of the tire building drum 2 of the present invention, reference may be had to FIGS. 2 through 5. FIG. 2 shows the internal construction of the right end 5 of the drum 2 which includes a radial support plate 6 having a central hub portion 7 for supporting the plate 6 on the drum shaft 8, with bushings 9 at both ends of the hub portion 7 to facilitate axial movement of the ends of the drum toward and away from each other as desired. Attached to the axial outer face of the radial plate 6 is an annular drum housing 10 which may be secured in place using suitable fasteners 11 extending through the drum housing 10 into tapped openings in the radial plate.

The annular drum housing 10 has a plurality of circumferentially spaced radially extending slots 12 therein for receipt of radial inward extensions 13 from a plurality of radially movable drum segments 14 which guide such drum segments as they are contracted and expanded in a manner to be subsequently described. A conventional drum segments 14 extending the full length of the drum may be used for making conventional tires, but such drum segments are desirably located only at the ends of the drum as shown to permit contracting and expanding of the center portion of the drum independently of the shoulders of the drum so that the drum may be expanded to toroidal shape for making radial or belted tires having substantially inextensible belts directly beneath the tread stock. A conventional tire building drum may also be used in the first stage building of radial tires that are built in two stages. After completion of the first stage, the tires are transferred to a radial tire building drum for the second stage building operation. Although the number of drum segments 14 may vary, the drum 2 illustrated has thirty-six such segments. A rubber cover 15 is ordinarily wrapped around the outer periphery of the drum as shown and the edges of the cover are turned down underneath the outer shoulders 16 of the drum segments 14 to facilitate clamping of the edges of the cover to the drum using suitable clamps 17.

During operation of the tire building machine 1, it is preferred that the expansion of the drum segments 14 be accurately controlled for proper positioning of the drum segments with respect to the tire beads B to be placed thereagainst, which may be of various sizes. Radial movement of the drum segments 14 is obtained by actuation of a drum segment expanding and contracting mechanism 20 including a plurality of pinions 21 rotatably mounted in the annular housing 10, one such pinion 21 being provided for each drum segment 14 and engaging a radial rack 22 on each drum segment extension 13. The pinions 21 are received in radial slots 23 in the annular housing 10 in axial alignment with the radial slots 12 for the drum segment extensions 13, and the shafts 24 for the pinions 21 are received in additional radial slots 25 extending transversely of the other slots 23. An annular cover plate 26 completely surrounds the annular housing 10 and is secured to the housing using fasteners 27. As apparent, rotation of the pinions 21 in opposite directions causes the drum segments 14 to move radially in and out.

To assure simultaneous movement of the drum segments 14 to the same radial extent, all of the pinions 21 are desirably driven by an axially movable annular rack 28 contained within the annular housing 10 radially inwardly of the pinions 21 and having a plurality of external axially spaced teeth 29 thereon in meshing engagement with all of the pinions. The annular rack 28 is axially slidably supported by the hub portion 7 of the radial plate 6 and has one or more axial openings 30 therein containing nuts 31 in threaded engagement with rods 32 extending longitudinally from one end of the tire building machine.

FIG. 1 shows one of the rods 32 which has a splined end 33 for attachment of a pinion 34. The pinion 34 is in meshing engagement with an internal ring gear 35 supported by a plate 36 having a bearing mounted hub portion 37 driven by a belt 38 from a suitable drive motor, not shown. The nuts 31 are retained against rotation within the annular rack 28, whereby rotation of the rods 32 causes axial movement of the annular rack 28 and simultaneous turning of all of the pinions 21 for simultaneously expanding and contracting the drum segments 14.

Controlled expansion and contraction of the drum segments 14 may be obtained by controlling the number of turns of the drive rods 32, and one or more adjustable stops 40 may also be provided in the annular rack 28 for limiting the amount of expansion of the drum segments. As clearly shown in FIG. 2, each such adjustable stop 40 may comprise a nut 41 retained against rotation in an axial stepped opening 42 in the annular rack 28 circumferentially spaced from the pinions 21. Threadedly engaging the nut 41 is a screw shaft 43 having a stop flange 44 on the axial inner end thereof for engagement with the radial plate 6 during axial movement to the left. Flats 45 may be provided on the axial outer end of the screw shaft 43 to facilitate turning of the screw shaft by a wrench for adjusting the clearance space between the stop flange 44 and radial plate 6. Once adjusted, the screw shaft 43 may be locked in its adjusted position by tightening of a lock nut 46 on the screw shaft. Preferably, three such adjustable stops 40 are provided, each located 120° apart around the circumference of the annular rack 28. Axial inward movement of the drum segments 14 is limited by engagement of the segments with the outer periphery of the radial plate 6.

The tire building drum 2 is mounted on the drum shaft 8 for rotation therewith by suitable means, not shown, during application of the tire plies P to the drum with the edges of the plies overhanging the ends of the drum as shown in FIG. 2. The tire plies P may be applied to the drum either before or after expansion of the drum segments 14 to the cylindrical shape 2" shown in phantom lines in FIGS. 1 and 2. If the tire plies are applied to the drum 2 with the drum segments 14 contracted as shown in solid lines in FIG. 2, the overhanging edges of the plies will automatically turn down over the ends of the drum during subsequent expansion of the drum segments to the phantom line position of FIG. 2, thus eliminating the need for a separate turn-down device.

The ply turn-up and side wall applying mechanism 4 shown in detail in FIG. 2 may be of the type shown and described in applicant's copending U.S. application Ser. No. 57,043, filed July 22, 1970, for "Ply Turn-Up and Side Wall Applying Mechanism for Tire Building Machine," executed on July 8, 1970, including an annular hub portion 47 axially slidably received on the drum shaft 8 and keyed thereto for rotation therewith, and having a pair of axially spaced radially extending annular plates 48 and 49 containing axially oppositely opening annular grooves 50 and 51 for receipt of the beads 52 and 53 of an annular air bag or bladder 54. A wedge ring 55 suitably fastened to the axial inner plate 48 has a beveled flange 56 extending into the annular groove 50 in the plate for securing one of the bladder beads 52 in place. The other bladder bead 53 is secured in place by the beveled axial inner end 57 of an outer shell 58 which surrounds the hub portion and supports the bladder 54 in a substantially flattened condition when deflated as shown. The axial outer plate 49 also has a cylindrical portion 59 surrounding the clearance space 60 between the two plates 48 and 49 to assist in supporting the bladder 54 in the flattened condition.

When deflated, the bladder 54 has a folded or looped inner marginal portion 61 which may be positioned closely adjacent the end of the drum 2 by moving the ply turn-up and side wall applying mechanism toward the drum. Preferably, the outer diameter of the bladder 54 when deflated is approximately the same as the outer diameter of the drum when contracted to provide in effect an extension of the drum for direct engagement by the overhanging edges of the tire plies as they are wrapped about the drum.

After the tire plies P have been applied to the drum 2 and the drum segments 14 have been expanded a predetermnied amount to properly locate the ends of the drum with respect to the bead setting ring 3 as previously described, the bead setting ring 3 is moved axially toward the end of the drum for setting of the tire bead B against the turned-down tire plies as shown in phantom lines in FIG. 2. Thereafter the bead setting ring 3 is retracted to provide sufficient room to permit inflation of the bladder 54 for effective ply turn-up.

Suitable air passages 62 are provided in the ply turn-up and side wall applying mechanism 4 for supplying air to the clearance space 60 between the bead clamping plates 48 and 49 to inflate the bladder. During inflation of the bladder, the turned-down ply edges are progressively turned about the tire bead B, and the bladder 54 is caused to roll over the outer diameter of the drum 2 for pressing the edges of the plies against the outer surface of the drum with the aid of a pusher ring 63 as shown in FIG. 5. Alternatively, a second annular bladder disposed radially inwardly of the first bladder may be used in place of the pusher ring to force the first bladder toward the end of the drum as in my aforementioned copending U.S. application Ser. No. 57,043, executed on July 8, 1970, as aforesaid, which is incorporated herein by way of reference.

The looped inner marginal portion 61 of the bladder 54 may be allowed to move radially outwardly as the bladder is inflated to cause limited relative sliding movement of the bladder over the end of the drum and turned-up plies for achieving more effective ply turn-up free of wrinkles and distortion as shown in FIG. 5. However, an annular insert 64 is desirably disposed within the clearance space 60 between the clamping plates 48 and 49 for extension into the inner marginal portion 61 of the bladder 54 as shown in FIG. 2 to restrict movement of the bladder margin 61 when applying the side wall material to the tire carcass by wrapping the side wall material about the bladder when deflated and subsequently inflating the bladder. This has the advantage that the distance between the bladder margin 61 and side wall material wrapped about the bladder will remain the same during inflation of the bladder for accurate placement of the side wall material against the tire carcass. When making radial or belted tires, the drum 2 is expanded to the toroidal shape 2''' shown in phantom lines in FIG. 1 by expanding the center of the drum while simultaneously moving the ends of the drum axially inwardly toward each other prior to placement of the tread stock and side wall material against the tire plies. For effecting such expansion of the drum suitable mechanism such as shown in applicant's copending U.S. application Ser. No. 642,067, filed May 29, 1967, now U.S. Patent No. 3,560,301, granted Feb. 2, 1971, may be provided. However, such mechanism forms no part of the present invention and is therefore omitted for purposes of simplification.

Axial movement of the annular insert 64 between the extended position shown in FIG. 2 in which the flange portion 65 of the insert protrudes into the inner marginal portion of the bladder and the retracted position shown in FIG. 5 in which such flange portion is positioned adjacent such inner marginal portion may be obtained by actuation of a ring-shaped piston 66 contained in a ring-shaped chamber 67 between the hub portion 47 and outer shell 58 of the mechanism. A plurality of circumferentially spaced rods 68 interconnect the annular ring and and insert. By alternately venting and pressurizing opposite ends of the annular chamber 67, the piston 66 and insert 64 will be caused to move back and forth while being guided by the cylindrical portion 59 of the axial outer plate 49.

Referring next to FIGS. 6 and 7, there is shown a modified form of tire building drum 2' and ply turn-up and side wall applying mechanism 4' in accordance with this invention which are similar to the corresponding parts of the tire building machine 1 of the FIGS. 1 through 5 embodiment, and accordingly the same reference numerals followed by a prime symbol are used to identify like parts. As in the FIGS. 1 through 5 embodiment, the tire building drum 2' consists of a plurality of radially movable segments 14' whose movements are controlled by axial movement of an annular rack 28' engaging a plurality of pinions 21' in meshing engagement with a corresponding number of radial racks (not shown), one for each drum segment. Similarly, the ply turn-up and side wall applying mechanism 4' includes an annular inflatable bladder 54' having a pair of beads 52' and 53' received in axially oppositely opening annular grooves 70 and 71 in a radial flange portion 72 projecting outwardly from a central hub portion 73 supported by the drum shaft. The bladder beads 52' and 53' are retained within the annular grooves 70 and 71 as by attaching clamping plates 74 and 75 to opposite sides of the radial flange portion, and an annular shell 58' surrounds the hub portions 73 for supporting the bladder in the flattened condition when deflated as before.

The annular bladder 54' of the FIGS. 6 and 7 embodiment also has a folded inner marginal portion 61'. However, such inner marginal portion 61', rather than simply being adapted to be positioned adjacent the end of the drum as in the FIGS. 1 through 5 embodiment, is clamped to the drum segments 14' for radial movement therewith. To facilitate attachment of the bladder margin to the drum segments 14', such drum segments may be provided with axial flange portions 76 projecting axially from the shoulder portions 77 radially inwardly of the outer periphery of the segments for attachment of a plurality of clamping elements 78 which define with the drum segments an annular groove 79 in which the inner marginal portion 61' of the bladder 54' is clamped. The axial inner shoulders 80 of the clamping elements 78 are slightly concave as shown to provide a circumferential groove 81 around the periphery of the drum to accommodate a tire bead B surrounding the drum when the drum segments 14' are moved radially outwardly as previously described. A rubber ring 82 may be disposed within the folded inner marginal portion 61' of the bladder 54' to facilitate clamping of the inner marginal portion within the annular groove 79, and the edges of the rubber drum cover 15' may also be clamped within the annular groove 79.

In operation, the drum 2' and adjacent ply turn-up and side wall applying mechanism 4' of the FIGS. 6 and 7 embodiment are rotated with the drum segments 14' contracted and the annular bladder 54' deflated to apply the tire plies P to the drum with the edges of the plies protruding beyond the end of the drum for engagement with the blader as shown in FIG. 6. Then a tire bead B is moved axially over the end of the drum 2' and inner marginal portion 61' of the bladder into radial alignment with the circumferential groove 81 at the drum shoulder using a bead positioning mechanism 83 which may comprise an axially movable support member 84 having a pivotally mounted jaw 85 for clamping the tire bead against the support member. Next the drum segments 14' are expanded which expands the tire plies P and inner marginal portion 61' of the bladder 54' located therebeneath into engagement with the inner diameter of the tire bead as shown in FIG. 7.

The circumferential groove 81 adjacent the drum shoulder provides an excellent seat for the bead, and the bead is concentrically located with respect to the drum because of the manner in which all of the drum segments 14' are uniformly expanded the desired amount. Moreover, because the inner marginal portion 61' of the bladder 54' is clamped to the drum segments 14', accurate positioning of the bladder with respect to the bead B is assured for obtaining tight turn-up of the plies around the bead during inflation of the bladder after the bead positioning mechanism 83 has been disengaged from the bead and withdrawn out of the way. The rest of the bladder 54', including the beads 52' and 53', remain stationary during expansion of the drum segments so as not to subject the bladder to unnecessary stresses.

If desired, the turning up of the tire plies P and placement of the side wall material S against the tire carcass may be accomplished in a single operation rather than two separate operations using the apparatus of FIGS. 6 and 7, since the inner marginal portion 61' of the bladder 54' does not move relative to the end of the drum during either operation. To accomplish such ply turn-up and side wall application in a single operation, the side wall material S is applied to the bladder 54' prior to the application of the tire plies P thereto as shown in FIG. 6, whereby after the drum segments 14' have been expanded and the tire bead B properly set, inflation of the bladder 54' will cause both ply turn-up and accurate placement of the side wall material.

As the bladder 54' is inflated, a pusher ring 63 such as shown in FIGS. 1 and 5 may be moved axially against the bladder to press the bladder against the end of the drum and cause the bladder to roll over the outer periphery of the drum. Alternatively, a second bladder may be used in place of the pusher ring. As shown in FIG. 8, the second bladder 86 is disposed radially inwardly of the first bladder 54' and lies flat therebeneath when both bladders are deflated. A pair of axially spaced apart annular plates 87 and 88 provided with annular grooves in opposite faces receive the beads 52', 53' and 93, 94 of the bladders which are clamped in place by clamping plates 95, 96 and 97. Each of the annular plates 87 and 88 has a radial passage 98 and 99 for inflating and deflating the annular bladders 54' and 86. Due to the natural tendency of the bladders to center with respect to their beads during inflation, the inner bladder 86 moves axially toward the adjacent end of the drum, causing the outer bladder 54' to roll onto the outer periphery of the drum. Otherwise, the details of construction and operation of the drum 2' and ply turn-up and side wall applying mechanism 4' of FIG. 8 are substantially the same as that shown and described in FIGS. 6 and 7, and will not be repeated.

From the foregoing, it will now be seen that the various forms of tire building machines shown and described herein provide for controlled expansion of the segments of an expandable tire building drum to facilitate setting of the tire beads against the ends of the drum. The inner marginal portions of the ply turn-up and side wall applying bladders may also be clamped to the ends of the drum using clamping elements which provide an annular groove to accommodate the tire beads when the drum segments are moved radially outwardly into engagement with the tire beads. This provides an excellent seat for the beads and results in uniform and concentric clamping of the beads because of the uniform manner in which the drum segments are expanded. Accurate positioning of the tire beads with respect to the folded bladder margin is also assured for obtaining tight turn-up of the plies around the tire beads during inflation of the bladder, and the side wall material may also be accurately applied to the tire carcass by the bladder either during ply turn-up or during a subsequent operation.

I, therefore, particularly point out and distinctly claim as my invention:

1. An expandable tire building drum comprising a drum housing, a plurality of circumferentially spaced radially movable drum segments adjacent at least one end of said drum, means mounting said drum segments for radial movement with respect to said drum housing, and means for simultaneously expanding and contracting said drum segments to the same extent comprising a plurality of radial racks carried by said drum segments for radial movement therewith, a plurality of circumferentially spaced pinions rotatably mounted in said drum housing and in meshing engagement with said radial racks, an annular rack having meshing engagement with all of said pinions, and means for moving said annular rack axially in opposite directions to cause simultaneous rotation of said pinions for expanding and contracting said drum segments as aforesaid.

2. The drum of claim 1 wherein said last-mentioned means comprises at least one rod having threaded engagement with a nut fixed to said annular rack, and means for rotating said rod to cause axial movement of said annular rack to the desired extent for controlled expansion and contraction of said drum segments.

3. The drum of claim 1 further comprising an annular plate axially spaced from said annular rack in the direction of movement of said annular rack for expanding said drum segments, and adjustable stop means carried by said annular rack for varying the maximum permissible movement of said annular rack toward said plate for controlled expansion of said drum segments.

4. The drum of claim 3 wherein said adjustable stop means comprises a nut retained against rotation in said annular rack, a screw shaft having threaded engagement with said nut, and a stop flange on the end of said screw shaft adjacent said annular plate, rotation of said screw shaft causing adjustment of the clearance space between said stop flange and annular plate.

5. The drum of claim 3 wherein there are a plurality of said adjustable stop means carried by said annular rack circumferentially spaced from said pinions.

6. In combination, an expandable tire building drum and a ply turn-up mechanism associated with at least one end of said drum, said expandable drum including a plurality of radially movable drum segments, and means for simultaneously expanding and contracting said drum segments; and said ply turn-up mechanism comprising an inflatable annular bladder having a pair of beads, support means for supporting said beads adjacent said one end of said drum, said bladder having a folded axial inner marginal portion, and means for clamping said folded axial inner marginal portion to said radially movable drum segments for radial movement therewith, thus to permit expansion of said folded inner marginal portion of said bladder into engagement with a tire bead disposed therearound, said support means supporting said beads against radial movement during radial movement of said folded axial inner marginal portion with said radially movable drum segments.

7. The combination of claim 6 wherein said means for clamping said folded axial inner marginal portion of said bladder to said drum segments comprises clamp means secured to said drum segments and defining therewith an annular groove in which said inner marginal portion of said bladder is clamped.

8. The combination of claim 7 wherein said drum further comprises an outer cover having one edge clamped in said annular groove with said inner marginal portion of said bladder.

9. The combination of claim 7 further comprising a flexible ring disposed within said inner marginal portion of said bladder which is clamped in said annular groove by said clamp means.

10. The combination of claim 7 further comprising a circumferential groove around the periphery of said clamped inner marginal portion of said bladder for receipt of a tire bead therein.

11. The combination of claim 7 wherein said clamp means comprises a plurality of clamp elements secured to said drum segments, said clamp elements having concave external shoulders which provide a circumferential groove around the periphery of said clamped inner marginal portion of said bladder for receipt of a tire bead therein.

12. The combination of claim 7 further comprising a pusher ring for applying an axial force to said bladder when inflated for urging said bladder toward said one end of said drum.

13. The combination of claim 7 further comprising a second bladder disposed radially inwardly of said first bladder which when inflated urges said first bladder toward said one end of said drum.

14. In a tire building machine, a tire building drum having an inflatable bladder disposed adjacent at least one end thereof, said tire building drum including a plurality of radially movable drum segments at least at said one end of said drum, and said inflatable bladder having a folded axial inner marginal portion clamped to said drum segments for radial movement therewith, thus to permit expansion of said folded inner marginal portion of said bladder into engagement with a tire bead disposed therearound, and a pair of beads, and rigid support means adjacent said one end of said drum for supporting said beads against radial movement during radial movement of said folded axial inner marginal portion with said radially movable drum segments.

15. The machine of claim 14 further comprising means defining a peripheral groove around said drum segments and folded inner marginal portion of said bladder clamped thereto for accommodating a tire bead disposed thereabout upon expansion of said drum segments and inner marginal portion of said bladder, and means for supporting such tire bead in radial alignment with said peripheral groove.

16. The machine of claim 14 further comprising means for simultaneously expanding and contracting said drum segments to the same extent comprising a plurality of radial racks carried by said drum segments for radial movement therewith, a drum housing, a plurality of circumferentially spaced pinions rotatably mounted in said drum housing and having meshing engagement with said radial racks, an annular rack having meshing engagement with all of said pinions, at least one rod having threaded engagement with a nut in said annular rack, and means for rotating said rod to cause axial movement of said annular rack for rotating all of said pinions causing simultaneous expansion and contraction of said drum segments as aforesaid.

17. In a tire building machine, a tire building drum having an inflatable bladder disposed adjacent at least one end thereof, said tire building drum including a plurality of radially movable drum segments at least at said one end of said drum, and said inflatable bladder having a folded inner marginal portion clamped to said drum segments for radial movement therewith and a pair of beads supported by rigid support means adjacent said one end of said drum against radial movement during radial movement of said folded inner marginal portion with said radially movable drum segments, drive means for rotating said drum and bladder for applying tire plies to said drum with at least one edge of such tire plies extending beyond said one end of said drum for support by said bladder while deflated, means for supporting a tire bead around said drum segments and inner marginal portion of said bladder, and means for expanding said drum segments and folded inner marginal portion of said bladder with tire plies wrapped thereabout into engagement with such tire bead disposed therearound.

18. The machine of claim 16 further comprising means for applying side wall material to said bladder adjacent said inner marginal portion prior to wrapping such tire plies thereabout, whereby subsequent inflation of said bladder will cause both ply turn-up and side wall placement in the same operation.

References Cited

UNITED STATES PATENTS

| | | | |
|---|---|---|---|
| 1,475,109 | 11/1923 | De Mattia | 156—418 |
| 1,735,896 | 11/1929 | De Mattia | 156—418 |
| 1,902,306 | 3/1933 | Kraft | 156—418 |
| 2,123,586 | 7/1938 | Heston | 156—418 |
| 3,188,260 | 6/1965 | Nebout | 156—401 X |
| 3,127,294 | 3/1964 | Porter | 156—401 X |
| 2,251,904 | 8/1941 | Breth et al. | 156—401 |
| 2,440,662 | 4/1948 | Frazier | 156—401 |
| 3,265,549 | 8/1966 | Woodhall et al. | 156—401 X |
| 3,433,695 | 3/1969 | Caretta et al. | 156—415 X |
| 3,490,980 | 1/1970 | Mallory et al. | 156—401 |

ROBERT F. BURNETT, Primary Examiner

C. B. COSBY, Assistant Examiner

U.S. Cl. X.R.

156—132, 418